United States Patent Office 3,427,326
Patented Feb. 11, 1969

3,427,326
2-TRICHLOROMETHYL-1,3-DIOXOLES AND THEIR PREPARATION
Heinz J. Dietrich, Bethany, Joseph V. Karabinos, Orange, and Robert J. Raynor, North Branford, Conn., assignors to Olin Mathieson Chemical Corporation
No Drawing. Filed Nov. 5, 1965, Ser. No. 506,591
U.S. Cl. 260—340.9                            5 Claims
Int. Cl. C07d 13/04, 13/08; A01n 9/28

---

ABSTRACT OF THE DISCLOSURE

The 2-trichloromethyl-1,3-dioxoles having the formula

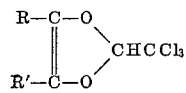

where R is phenyl or alkyl of 1 to 6 carbons and R' is hydrogen, phenyl or alkyl of 1 to 6 carbons are prepared from intermediates having the formula

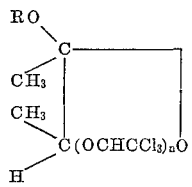

where R is acyl or hydrogen and $n$ is 1 or 2. The 2-trichloromethyl-4-methyl-1,3-dioxole is prepared from 2-trichloromethyl-4-methylene - 1,3 - dioxolane using an alkaline reacting clay catalyst.

---

This invention relates to novel compositions of matter and to processes for producing them. More particularly, this invention relates to novel compositions of matter having the formula

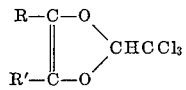

where R is phenyl or alkyl of 1 to 6 carbons and R' is hydrogen, phenyl or alkyl of 1 to 6 carbons, to processes for producing these compounds and to certain novel intermediates useful in preparing them.

The principal object of this invention is to provide the heretofore unknown compositions of this invention. Another object to to provide processes for preparing them. Still another object is to provide novel monomers for polymerization, flame retardants, oxidation inhibitors, fungicides, nematocides and herbicides. These objects have been accomplished in accordance with the invention disclosed herein.

The compounds having the above formula are 2-trichloromethyl-1,3-dioxoles variously substituted in the 4 and 5 positions. Examples include:

2-trichloromethyl-4,5-dimethyl-1,3-dioxole
2-trichloromethyl-4,5-diphenyl-1,3-dioxole
2-trichloromethyl-4-methyl-1,3-dioxole The 2-trichloromethyl-4,5-dimethyl-1,3-dioxole is prepared from acetoin and chloral in a series of steps comprising a first step in which acetoin is reacted with chloral in the presence of pyridine at 60° to 80° C. to form a first reaction mixture containing 2-trichloromethyl-4,5-dimethyl-4-hydroxy-1,3-dioxolane and 2,4-bis(trichloromethyl)-6,7-dimethyl-6-hydroxy-1,3,5-trioxepane, a second step in which an acylating agent, for example, acetic anhydride is added to said first reaction mixture, heating to form a second reaction mixture containing 2-trichloromethyl-4,5-dimethyl-4-acetoxy - 1,3 - dioxolane and 2,4-bis(trichloromethyl)-6,7-dimethyl - 6 - acetoxy-1,3,5-trioxepane and separating the 2-trichloromethyl-4,5-dimethyl-4-acetoxy-1,3-dioxolane and a third step of deacetylating this acetoxy - 1,3 - dioxolane to form the 2-trichloromethyl-4,5-dimethyl-1,3-dioxole. The hydroxy and acyloxydioxolanes and trioxepanes are also novel compounds.

In the first step, appropriately the reaction is carried out by refluxing a solution of the reactants in an inert solvent. The reaction is essentially complete after from 2 to 6 hours, preferably about 3 to 5 hours. The acetoin and chloral need not be anhydrous since the refluxing, particularly with a water-immiscible inert solvent carries the water out and it is suitably trapped from the reflux stream. Stoichiometric ratios of acetoin to chloral are preferred but these may vary from 1:2 to 2:1.

In the second step, the hydroxydioxolane formed in the first step is acylated, with or without isolation of the hydroxydioxolane, by reaction with any suitable acylating agent including particularly the anhydrides or chlorides of aliphatic acids of 2 to 6 carbons, for example, acetyl chloride, acetic anhydride and isobutyryl chloride and of aromatic carboxylic and sulfonic acids, for example, benzoyl chloride and p-toluene sulfonyl chloride.

Following the acylation in the second step, the dioxolane ester is appropriately recovered by vacuum fractionation and the trioxepane ester by crystallization.

The novel intermediates of this invention are the hydroxy, and acyloxy dioxolanes having the formula

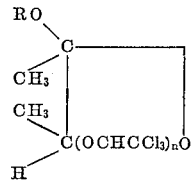

where R is acyl or hydrogen. When $n$ is 1 these compounds are 2-trichloromethyl-4,5-dimethyl-4-acyloxy (or 4-hydroxy)-1,3-dioxolanes and when $n$ is 2 these compounds are 2,4-bis(trichloromethyl)-6,7-dimethyl-6-acyloxy (or 6-hydroxy)-1,3,5 trioxepanes.

The 2-trichloromethyl-4,5-dimethyl-1,3-dioxole of this inevntion is prepared by heating a mixture of 2-trichloromethyl-4,5-dimethyl-4-acyloxy-1,3-dioxolane, for example, the acetoxy-dioxolane, with barium oxide at 180° to 200° C. for several hours, cooling and removing the barium oxide and any other solids, for example, by filtration and fractionally distilling under reduced presure to recover the product. Suitably the amount of barium oxide used is from 10 percent, based on the starting material, up to an equal weight thereof.

Alternatively, the mixture of acetoxydioxolane and barium oxide is suitably heated at temperatures of 150° to 200° C. for 1 to 10 hours, preferably about 3 to 6 hours. The entire reaction mixture, without removing the barium oxide and other solids, for example, barium acetate, is fractionally distilled in vacuum to recover the 2-trichloromethyl-4,5-dimethyl-1,3-dioxole.

Although certain 1,3-dioxoles are now made accessible by direct condensation of chloral and alpha-hydroxyketones according to this invention, the 4,5-dimethyldioxole of this invention is not obtained by the direct reaction of chloral and acetoin. Chloral is a reactive compound which under some conditions for example, in contact with pyridine or basic metallic oxides, readily decomposes to form chloroform and other products and under other conditions polymerizes to form resins and tars. It was surprising to find means for converting chloral in this indirect way to form 2-trichloromethyl-4,5-dimethyl-1,3-dioxole.

The 2-trichloromethyl-4,5-diphenyl-1,3-dioxole of this invention is prepared by heating a mixture of benzoin and chloral in the presence of a catalytic amount of an acid catalyst, for example, p-toluene sulfonic acid at 60° to 140° C. to form a reaction mixture containing 2-trichloromethyl-4,5-diphenyl-1,3-dioxole and recovering the desired product. Water is formed as a by-product in the reaction and it is advantageously removed continuously. Appropriately the reaction is carried out by refluxing a solution of the reactants in an inert, water-immiscible solvent arranged to trap out the byproduct water. The reaction is essentially complete when no more water forms. Usually 5 to 10 hours are required, preferably about 6 to 8 hours.

An acid catalyst in this process of this invention, protonic acids having a pK constant of 4 or less measured in water at 25° C. are suitable, including both inorganic and organic acids. Examples include perchloric acid, hydrochloric acid, sulfuric acid, phosphoric acid, hydrofluoric acid and p-toluenesulfonic acid.

Suitable inert, water immiscible solvents include hydrocarbons and halohydrocarbons generally having boiling points above about 60° C. and preferably not above about 140° C. Examples include petroleum ether, hexane, benzene, toluene, xylene, carbon tetrachloride and ethylene dichloride.

In the recovery of the product, the catalyst is suitably first neutralized by adding an alkaline material, e.g., sodium carbonate or bicarbonate. The product is suitably recovered by crystallization or distillation in vacuum. The distillation is best carried out in the presence of basic agents, e.g., sodium bicarbonate, since acid decomposition products catalyze degradation and turn the desired product into dark, polymeric masses.

The formation of 2-trichloromethyl-4,5-diphenyl-1,3-dioxole is an unexpected and unusual reaction because the synthesis of cyclic acetals of chloral usually requires the action of large amounts of strong, dehydrating mineral acids and elevated temperatures. According to this process of the present invention, only catalytic quantities of acid are required and the water is easily removed azeotropically. Additionally, the fixation of the enolic form of a ketone by acetal formation with an aldehyde is a novel reaction for which no precedent was found in the literature, although acylations and etherifications of enols belong to the most thoroughly studied organic syntheses.

The 2-trichloromethyl-4-methyl-1,3-dioxole of this invention is prepared by heating 2-trichloromethyl-4-methylene-1,3-dioxolane with an alkaline reacting clay catalyst at 150° to 250° C. for 10 to 60 minutes, cooling the reaction mixture rapidly to room temperature and separating the resulting 2-trichloromethyl-4-methyl-1,3-dioxole from the cooled reaction mixture by any suitable means, for example, by distillation under reduced pressure.

The 4-methylene starting material is obtained by dehydrochlorinating 2-trichloromethyl-4-chloromethyl-1,3-dioxolane, suitably with alcoholic potash.

Suitable alkaline reacting clays include certain Linde molecular sieves, for example type 13X, and treated diatomaceous earth having a pH of, for example, 8 to 10. Other alkaline reacting clays are also suitable. Generally from 10 to 50 grams of catalyst per gram mole of starting material is suitable.

This rearrangement process of the invention generally proceeds in good yields in from 10 to 60 minutes at temperatures of 150 to 250° C., temperatures of 165 to 200° C. being preferred. Better yields are obtained by cooling the reaction mixture rapidly to room temperatures. The catalyst is suitably removed, for example, by filtration and the liquid is fractionally distilled in vacuum to recover the product.

This novel product of the invention is not accessible, as might be expected, by direct reaction of chloral with acetol. Chloral is a reactive compound which under some conditions readily decomposes to form chloroform and other products and under other conditions polymerizes to form resins and tars. It was therefore surprising to find means for producing 2-trichloromethyl-4-methyl-1,3-dioxole by this rearrangement method of the invention.

The dioxoles of this invention are useful as antioxidants. For example, a solution of 6.8 g. of 2-trichloromethyl-4,5-diphenyl-1,3-dioxole in 100 ml. of ethanol was exposed with stirring to atmospheric oxygen at room temperature. Approximately 250 ml. of oxygen were consumed over a period of 33 hours. The methyl- and the dimethyldioxoles showed comparable reactivities towards oxygen. The latter two compounds are also useful in polymerization reactions, especially since their high chlorine content increases the flame resistance of polymers containing these dioxoles. The acyldioxolanes are also useful in solvent degreasing of metals, as corrosion inhibitors for metal paints, additives for lubricating oils and as plasticizers for vinyl polymers.

EXAMPLE I

Preparation of 2 - trichloromethyl-4,5-dimethyl-4-acetoxy-1,3-dioxolane and 2,4-bis(trichloromethyl)-6,7-dimethyl-6-acetoxy-1,3,5-trioxepane To a mixture of 189 g. (2.15 moles) acetoin, containing 7% $H_2O$, 660 ml. benzene, and 200 ml. pyridine was added slowly, with stirring, under nitrogen 295 g. (2 moles) anhydrous chloral, causing a temperature increase from 25° to 66° C. The mixture was refluxed for 3½ hours during which time 8.5 ml. water separated in a Dean-Stark trap. After cooling, 222 g. of acetic anhydride was added slowly under nitrogen and the mixture was refluxed for 2 hours, followed by removal of most of the solvents by distillation up to a vapor temperature of 105° C. The residue was extracted five times with water, taken up in chloroform, dried, and distilled through a spinning band column. The fraction, boiling at 72–74° C. under 0.3 mm. Hg comprised 336 g. or 60.5% of theory for 2-trichloromethyl-4,5-dimethyl-4-acetoxy-1,3-dioxolane.

Analysis for $C_8H_{11}Cl_3O_4$.—Calc.: 34.63% C; 3.96% H; 38.4% Cl; M.W. 278.5. Found: 35.1% C; 4.06% H; 38.75% Cl; M.W. 281 (osmometer).

The product was separated by vapor phase chromatography into two isomers, identified by n.m.r. spectroscopy to be cis and trans-arrangements of the trichloromethyl and the acetoxy groups with respect to the dioxolane ring.

The product was tested and showed activity as a fungicide. When 0.2 ml. of the compound were added to 15 ml. of nutrient agar inoculated with proteus mirabilus and the culture incubated, the microorganism did not grow. Control cultures showed normal growth.

This 2 - trichloromethyl-4,5-dimethyl-4-acetoxy-1,3-dioxolane was also tested and shown to be active as a pre-emergence herbicide and as a nematocide.

From the distillation residue was isolated the acetoxylated addition product of 2 molecules of chloral to acetoin, namely, 2,4-bis(trichloromethyl) - 6,7 - dimethyl - 6-acetoxy-1,3,5-trioxepane, in 6.2% yield based on the acetoin, colorless crystals, M.P. 144–145° C. (uncorr.) from methanol.

Analysis for $C_{10}H_{12}Cl_6O_5$.—Calc.: 28.34% C; 2.83% H; 50.15% Cl; M.W. 425. Found: 28.24% C; 2.79% H; 50.00% Cl; M.W. 439 (osmometer).

The n.m.r. spectrum of this compound did not show the presence of isomers.

This product was tested and showed activity as a pre-emergence herbicide.

EXAMPLE II

Preparation of 2-trichloromethyl-4,5-dimethyl-1,3-dioxole

A mixture of 55.5 g. of 2-trichloromethyl-4,5-dimethyl- 5-acetoxy-1,3-dioxolane with 33.6 g. of barium oxide was heated under nitrogen and a vacuum of 60 mm. at 180° to 200° (bath temperature) for 5 hours. A flash distillation at 18 mm. Hg yielded 5–10% of liquids, boiling below the starting material (130° C. at 18 mm. Hg). Redistillation through a spinning band column yielded 2-trichloromethyl-4,5-dimethyl-1,3-dioxole, boiling at 80–85° C. at 18 mm. Hg. The structure was proved by:

(a) N.m.r. spectrum, showing 6 protons of the methyl type, 1 of the acetal type, and no other protons;
(b) Mass spectrum, showing a parent mass of 217 and confirming diffraction patterns; and
(c) Infrared spectrum, showing unsaturation around 5.7 to 6 microns which is characteristic for halo-alkyl substituted dioxoles or 4-methylene dioxolanes.

EXAMPLE III

Preparation of 2-trichloromethyl-4,5-diphenyl-1,3-dioxole

To 142 parts of pure benzoin in 250 ml. of anhydrous benzene was added a molar excess of distilled anhydrous chloral (approx. 115 g.) and the mixture was refluxed for 10 minutes under nitrogen in a Dean-Stark apparatus. As a catalyst, 1.0 g. of p-toluene sulfonic acid was added and refluxing under nitrogen was continued until no more water distilled over. 12.8 ml. of $H_2O$ had collected in the Dean-Stark trap over a period of 6–8 hours. All following operations were carried out under nitrogen. The solvent was removed under vacuum. The residue was dissolved in 400 ml. hot hexane, an excess of powdered sodium bicarbonate was added to neutralize the catalyst, followed by charcoal for adsorbing carbonyl containing by-products, and the mixture was filtered hot. Upon cooling in an ice-salt mixture, there crystallized from the filtrate 195 g. of light yellow needles, M.P. 56° C. (uncorr.). This corresponds to a yield of 85.6% of theory. After recrystallizing, colorless needles of 2-trichloromethyl-4,5-diphenyl-1,3-dioxole were obtained, M.P. 59.4–59.8° C. (corr.), B.P. 162–166° C. at 0.1 to 0.15 mm. Hg with slow decomposition.

Analysis for $C_{16}H_{11}O_2Cl_3$.—Calc.: 56.3% C; 3.2% H; 31.2% Cl; M.W. 341.6. Found: 55.9% C; 3.1% H; 31.35% Cl; M.W. 340 (osmometer).

A nuclear magnetic resonance spectrum showed a ratio of 10 aromatic to 1 aliphatic proton of the acetal type.

EXAMPLE IV

Preparation of 2-trichloromethyl-4-methyl-1,3-dioxole

A mixture of 61.2 g. (0.3 m.) 2-trichloromethyl-4-methylene-1,3-dioxolane and 3.0 g. Linde molecular sieve type 13X was heated under a nitrogen blanket to a temperature of 125° C. At this temperature an exotherm occurred which rapidly elevated the temperature to 250° C. Over a five minute period the mixture was allowed to cool to 175–185° C. and then maintained at this temperature range for an additional 10 minutes. The volatiles (36 g.) were separated by distillation of the reaction mixture at reduced pressure (B.P. 69–75°/7 mm.) and subjected to n.m.r. analysis which defined them as being a mixture of 60% dioxolane and 40% dioxole. This mixture was recombined with the catalyst-distillation residue and heated as before at 185–225° C. for an additional 20 minutes, then distilled. This distillate now contained 75% dioxole as defined by n.m.r. This distillate was then fractionally distilled twice to yield approximately 15 g. of the dioxole of 92% purity (B.P. 66–67° C./7.8 mm.; $n_D^{25}$ 1.4815).

EXAMPLE V

Preparation of 2-trichloromethyl-4-methyl-1,3-dioxole

A mixture of 20.4 g. (0.1 mole) of 2-trichloromethyl-4-methylene-1,3-dioxolane and 1.0 g. Linde molecular sieve (type 13X) catalyst was heated under a nitrogen blanket for 30 minutes at 165–170° C., then cooled rapidly to room temperature. Analysis of the resulting mixture by n.m.r. showed it to contain 63% of 2-trichloromethyl-4-methyl-1,3-dioxole.

EXAMPLE VI

Preparation of 2-trichloromethyl-4-methyl-1,3-dioxole

A mixture of 20.4 g. (0.1 mole) of 2-trichloromethyl-4-methylene-1,3-dioxolane and 5 g. of diatomaceous earth of pH 8–10 was heated under nitrogen blanket at 180° to 195° C. for 15 minutes. The resulting mixture was analyzed by n.m.r. and found to contain 60% of 2-trichloromethyl-4-methyl-1,3-dioxole.

What is claimed is:
1. A compound having the formula:

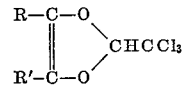

where R is phenyl or alkyl of 1 to 6 carbons and R' is hydrogen, phenyl or alkyl of 1 to 6 carbons.
2. 2-trichloro-methyl-4,5-dimethyl-1,3-dioxole.
3. 2-trichloromethyl-4,5-diphenyl-1,3-dioxole.
4. 2-trichloromethyl-4-methyl-1,3-dioxole.
5. Method of preparing 2-trichloromethyl-4-methyl-1,3-dioxole which comprises heating 2-trichloromethyl-4-methylene-1,3-dioxolane with an alkaline reacting clay catalyst selected from the group consisting of an alkaline reacting molecular sieve and an alkaline reacting diatomaceous earth at 150 to 250° C. for 10 to 60 minutes to form a reaction mixture containing said 2-trichloromethyl-4-methyl-1,3-dioxole, cooling said reaction mixture rapidly to room temperature and separating said 2-trichloromethyl-4-methyl-1,3-dioxole from said cooled reaction mixture by distillation under reduced pressure.

References Cited

Dietrich et al.: "Journal of Organic Chemistry," vol. 31 (4), 1966, pp. 1127–30.

ALEX MAZEL, *Primary Examiner.*

J. H. TURNIPSEED, *Assistant Examiner.*

U.S. Cl. X.R.

260—338, 999; 71—88.